A. B. HUTCHINS.
Churn Dasher.
No. 62,633.
Patented March 5, 1867.
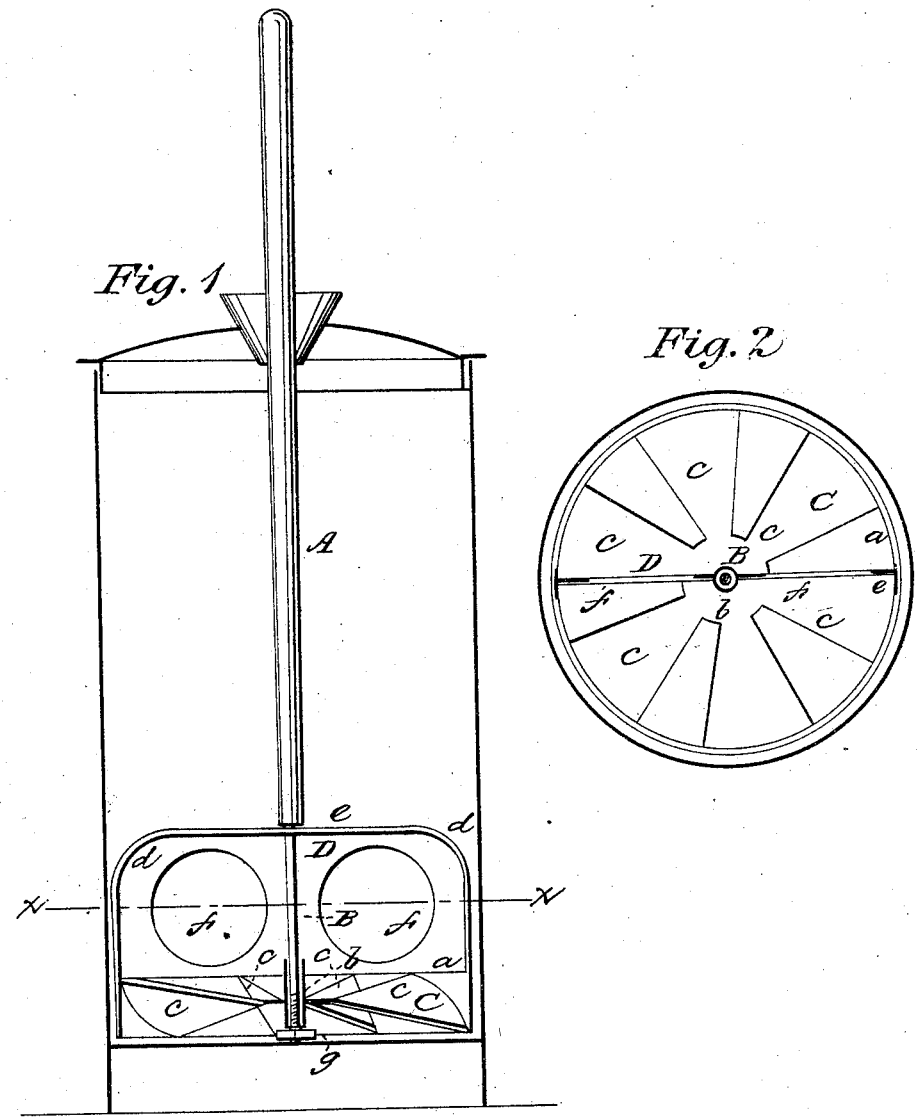
Witnesses:
Theo. Fusch
J. A. Service
Inventor:
A B Hutchins
Per Munn
Attorney

United States Patent Office.

A. B. HUTCHINS, OF PATCHOGUE, NEW YORK.

Letters Patent No. 62,633, dated March 5, 1867.

IMPROVEMENT IN CHURN-DASHER.

*The Schedule referred to in these Letters Patent and making part of the same.*

TO ALL WHOM IT MAY CONCERN:

Be it known that I, A. B. HUTCHINS, of Patchogue, in the county of Suffolk, and State of New York, have invented a new and improved Churn-Dash; and I do hereby declare that the following is a full, clear, and exact description thereof, which will enable those skilled in the art to make and use the same, reference being had to the accompanying drawings, forming part of this specification, in which—

Figure 1 is a side view of my invention placed in a cream receptacle.

Figure 2, a horizontal section of the same taken in the line $x\,x$, fig. 1.

Similar letters of reference indicate corresponding parts.

This invention consists in constructing a churn-dash in such a manner that it will be rotated by an up-and-down movement in the operation of churning, and the cream thereby subjected to a violent agitation, which will cause the butter to be produced within a very short period of time.

A represents the rod or staff of the dash, in the lower end of which a metallic rod, B, is fitted. C represents the lower part of the dash, which is constructed similar to a wind-wheel, to wit, of a rim, $a$, connected to a central plate or hub, $b$, by oblique arms, $c$. The upper part of the dash consists of a vertical plate, D, which extends entirely across the lower part C at its centre, said plate D being rounded at its upper corners, as shown at $d$, and the edge of the plate having a rim, $e$, attached, which is formed of a flat strip projecting out beyond both sides of the plate. The plate or part D of the dash has openings, $f$, made in it, two or more, as shown clearly in fig. 1. This dash is fitted loosely on the rod B, so that it may turn freely thereon, and is secured on the rod by a screw-nut, $g$. From the above description it will be seen that when the rod or staff A is raised the dash will be turned in one direction, and when lowered turned in the other direction, the turning motion being produced by the resistance the cream offers to the oblique arms $c$. This turning movement of the dasher agitates the cream and causes butter to be produced in a very short period of time. The holes or openings $f$, in the plate or upper part D, are designed to allow the dash to turn easily; a solid or close plate would require considerable power to operate the dash owing to the resistance the cream would offer to it. This invention has been practically tested and operates well. The rod or staff A may be of wood, and the dash of metal, galvanized or tinned to prevent oxidation.

Having thus described my invention, what I claim as new, and desire to secure by Letters Patent, is—

The dash C, consisting of the rim $a$, connected by oblique arms $c$ to hub $b$, and vertical plate D, with rounded corners, rim $e$, and opening $f$, and fitted loosely on the rod B, operating as described, substantially as specified.

A. B. HUTCHINS.

Witnesses:
CHARLES PRICE.
THEO. DAERNERT.